US007685032B2

(12) United States Patent
Zias et al.

(10) Patent No.: US 7,685,032 B2
(45) Date of Patent: Mar. 23, 2010

(54) EMPLOYMENT-TAX INFORMATION AGGREGATOR

(75) Inventors: Jeff A. Zias, Los Altos, CA (US); Terry Hicks, Mountain View, CA (US); Arun Varshney, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 202 days.

(21) Appl. No.: 11/528,180

(22) Filed: Sep. 26, 2006

(65) Prior Publication Data

US 2008/0077503 A1 Mar. 27, 2008

(51) Int. Cl.
*G06F 17/22* (2006.01)
*G07F 19/00* (2006.01)
*G07B 17/00* (2006.01)

(52) U.S. Cl. .......................................... 705/31; 705/30

(58) Field of Classification Search ................... 705/30, 705/31
See application file for complete search history.

(56) References Cited

U.S. PATENT DOCUMENTS

| | | | | | |
|---|---|---|---|---|---|
| 5,799,283 | A | * | 8/1998 | Francisco et al. | 705/19 |
| 6,829,588 | B1 | * | 12/2004 | Stoutenburg et al. | 705/30 |
| 6,901,430 | B1 | * | 5/2005 | Smith | 709/206 |
| 2003/0105686 | A1 | * | 6/2003 | Dang et al. | 705/31 |
| 2003/0188260 | A1 | * | 10/2003 | Jensen et al. | 715/505 |
| 2003/0216978 | A1 | * | 11/2003 | Sweeney et al. | 705/30 |
| 2003/0233296 | A1 | * | 12/2003 | Wagner | 705/31 |
| 2004/0083145 | A1 | * | 4/2004 | Kobayashi et al. | 705/31 |
| 2004/0205533 | A1 | * | 10/2004 | Lopata et al. | 715/507 |
| 2005/0060234 | A1 | * | 3/2005 | Reahard | 705/19 |
| 2005/0119955 | A1 | * | 6/2005 | Dang et al. | 705/31 |
| 2005/0131725 | A1 | * | 6/2005 | Sleeper et al. | 705/1 |
| 2005/0283442 | A1 | * | 12/2005 | Powell et al. | 705/64 |
| 2007/0005461 | A1 | * | 1/2007 | Lenz | 705/31 |
| 2007/0198910 | A1 | * | 8/2007 | Jensen et al. | 715/505 |
| 2007/0225998 | A1 | * | 9/2007 | Howell | 705/1 |
| 2009/0240607 | A1 | * | 9/2009 | Shortridge | 705/30 |

OTHER PUBLICATIONS

Free IRS TIN Matching Service. (Sep. 2006). The Disclosure, 23(9), 13-14. Retrieved Oct. 28, 2009, from Banking Information Source. (Document ID: 1126786891).*

Trish O'Kane. (2006). United by a Common Language: Developing a Corporate Taxonomy. Information Management Journal, 40(4), 58-63. Retrieved Oct. 28, 2009, from ABI/INFORM Global. (Document ID: 1081550121).*

* cited by examiner

*Primary Examiner*—Matthew S Gart
*Assistant Examiner*—Harshad Parikh
(74) *Attorney, Agent, or Firm*—Park, Vaughan & Fleming LLP

(57) ABSTRACT

A system for paying and filing employment tax operates by updating a set of electronic templates such that the electronic templates are compatible with current formats of associated governmental agencies, receiving financial information associated with a user, selecting an electronic template from the set of electronic templates, and merging the financial information with the electronic template to produce a document. This financial information includes employment-tax information that has a format that is compatible with payroll-accounting software, and the electronic template is compatible with a submission format of a governmental agency. Next, the system submits the document to the governmental agency.

17 Claims, 10 Drawing Sheets

... — EMPLOYER TAX INFORMATION 616-1 — EMPLOYEE TAX INFORMATION 614-1 — RATE INFORMATION 612-1

FINANCIAL INFORMATION 610-1 | FINANCIAL INFORMATION 610-2 | ...

... — FORMAT 714-1 — GOVERNMENTAL AGENCY 712-1

TEMPLATE 710-1 | TEMPLATE 710-2 | ...

EMPLOYMENT-TAX INFORMATION AGGREGATOR

BACKGROUND

The present invention relates to techniques for aggregating information.

Employers and employees are required to report withholdings and unemployment insurance taxes that are associated with employees' salaries, on a monthly or bimonthly basis, when paychecks are issued. These levies typically require an employer to file taxes (also referred to as filings) on a quarterly and annual basis and liability (also referred to as payments) on a weekly, bi-weekly, monthly, quarterly or annual basis. To streamline this process, many governmental agencies at the local, state and federal level are allowing these filings and payments to be submitted electronically, for example, on a web page or website that is accessible via the Internet or World Wide Web. Users connect to such sites, provide the necessary one-time enrollment information, and then file or pay their taxes on a regular basis.

Unfortunately, the systems employed by these various governmental agencies are often not very sophisticated, which typically requires employers to logon and type data on multiple websites operated by federal and state tax agencies. In addition, most of these web pages and websites are customized to the needs of the corresponding governmental agencies. As a consequence, each of these web pages and web sites presents a different experience to users as they navigate, access accounts, and pay and file taxes. This complexity is a burden to the users that increases the difficulty and expenses associated with paying and filing employment taxes.

At the same time, financial-accounting software, such as payroll-accounting software, is becoming increasingly popular. This software offers a broad range of functionality to users, such as the ability to determine employment taxes when generating paychecks, and compiling account history and statistical information that are used in preparing employment tax filings and payments. During this process, these programs often assemble considerable financial information about their users. However, existing payroll-accounting software is not configured to leverage this information to assist users in interacting with the wide variety of websites and web pages used by various governmental agencies.

SUMMARY

One embodiment of this invention provides a system for paying employment tax. The system updates a set of electronic templates such that the electronic templates are compatible with current formats of associated governmental agencies. Then, the system receives financial information associated with a user. Next, the system selects an electronic template from the set of electronic templates, and merges the financial information with the electronic template to produce a document. This financial information includes employment-tax information that has a format that is compatible with payroll-accounting software, and the electronic template is compatible with a submission format of a governmental agency. Finally, the system submits the document to the governmental agency.

In some embodiments, the system receives an acknowledgement from the governmental agency. The system may parse this acknowledgement to extract information and/or may provide this information to a user.

In some embodiments, the payroll-accounting software includes QuickBooks™.

In some embodiments, the governmental agency includes a withholding agency, an unemployment agency, a filing agency, and/or an payment agency. Furthermore, in some embodiments the governmental agency includes a local, state, or federal agency.

In some embodiments, the employment tax information includes payroll-tax information for an employee and/or payroll-tax information for an employer.

In some embodiments, the system submits the document by bridging its content into an information portal based on probabilistic rules for matches between formats of the document and the information portal.

In some embodiments, information is presented to the user while the document is being submitted to allow the user to monitor the submission.

In some embodiments, the system accesses an information portal, such as a website or web page, of the governmental agency via a network, where the accessing operation may involve a login procedure. Furthermore, the system may aggregate additional information for an employee or employer from the governmental agency and/or may provide such information to the user. This additional information may include taxation rates for an employee and/or unemployment-insurance rates for an employer. In some embodiments, while aggregating the additional information, the system browses the information portal, scrapes the content on the information portal, and parses the additional information from the subset of the content.

In some embodiments, the system reconciles an account history using the additional information.

In some embodiments, the financial information is stored at a remote location and is accessed via a network.

Another embodiment provides a method including at least some of the above-described operations.

Another embodiment provides a computer program product for use in conjunction with the computer system.

BRIEF DESCRIPTION OF THE FIGURES

FIG. 5C is a block diagram illustrating a screen shot of a user interface in an embodiment of the present invention.

FIG. 5D is a block diagram illustrating a screen shot of a user interface in an embodiment of the present invention.

FIG. 6 is a block diagram illustrating a data structure in accordance with an embodiment of the present invention.

FIG. 7 is a block diagram illustrating a data structure in accordance with an embodiment of the present invention.

DETAILED DESCRIPTION

Figure 1:
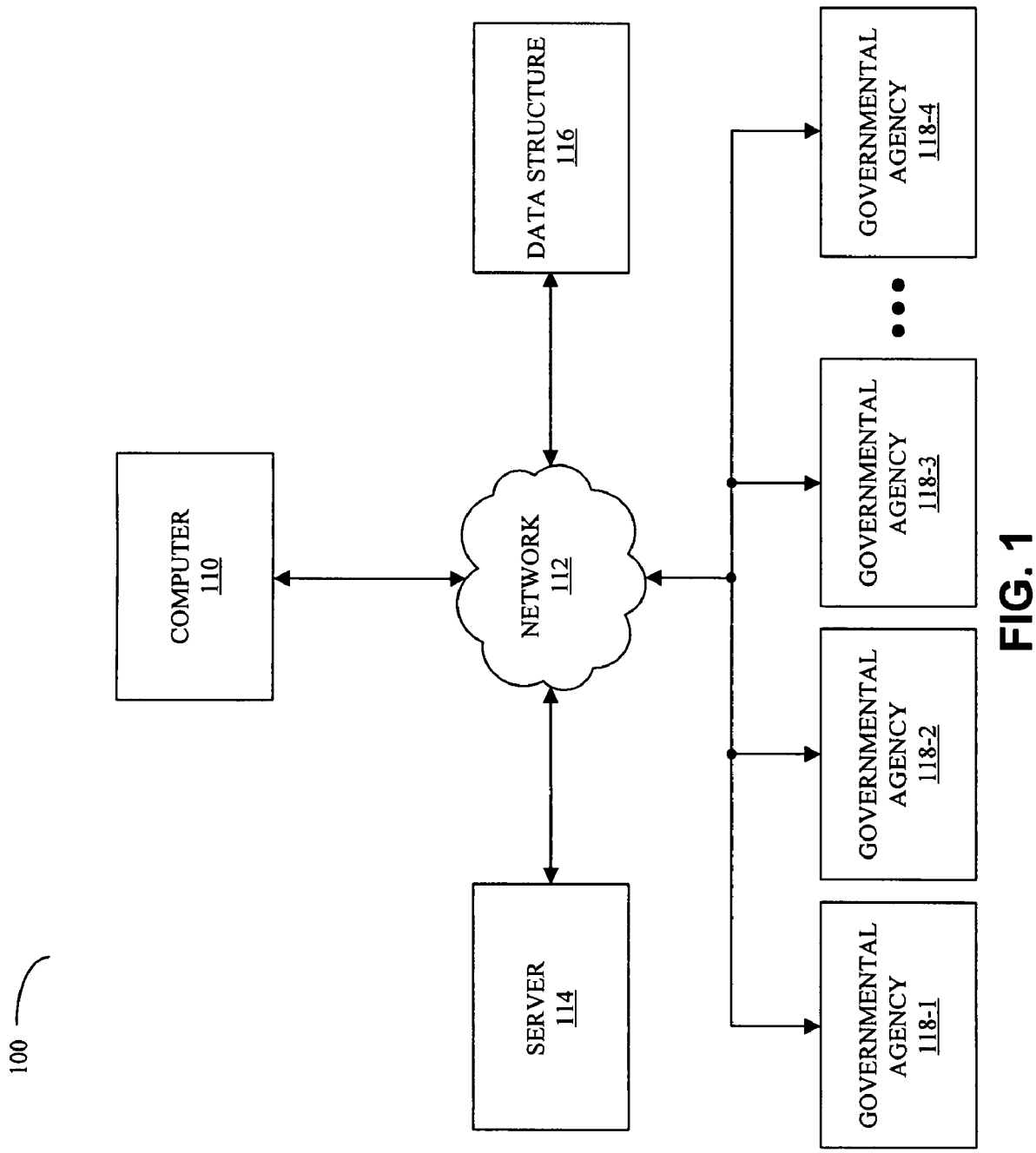
FIG. 1 is a block diagram illustrating a computer system including computers and servers that are networked together in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (i.e., software) for use with the computer system are described. These devices and processes may be used to pay employment tax for an employer and/or an employee. In particular, a set of electronic templates may be updated such that the electronic templates are compatible with current formats of associated governmental agencies. Then, stored financial information for the employer and/or the employee may be received and an electronic template may be selected from the set of templates that are associated with corresponding local, state, and/or federal governmental agencies (such as a withholding agency, an unemployment agency, a filing agency, and/or a payment agency). This financial information may include employment-tax information (such as payroll tax information for the employee and/or payroll-tax information for the employer) that has a format that is compatible with payroll-accounting software. In one embodiment, the payroll-accounting software includes software such as Quicken™ and/or TurboTax™ (from Intuit, Inc., of Mountain View, Calif.), PeachTree Complete™ (from the Sage Group PLC, of London, the United Kingdom), MYOB Business Essentials™ (from MYOB US, Inc., of Rockaway, N.J.), and/or other financial-accounting software capable of processing payroll information. Furthermore, the electronic template may be compatible with a submission format of one of the governmental agencies.

The financial information is merged with the electronic template to generate a document, and the document is submitted. In some embodiments, the document is submitted by bridging its content into an information portal (such as a website or web page) of the governmental agency based on probabilistic rules for matches between formats of the document and the information portal.

The submission process may be performed in real-time or over an extended time interval (i.e., partially completed electronic templates or documents may be stored for later use). The former may be useful when exceptional (one-time) payments are made. Therefore, in some embodiments status information during the submission process may be presented to allow an individual (such as a user of the computer system) to monitor the transaction. Furthermore, acknowledgement information (including a time stamp) received from the governmental agency may be presented to the individual after the transaction is completed.

The individual may provide supplemental information to assist in completing the document. In addition, the computer system may access the information portal of the governmental agency via a network to obtain additional information (such as taxation rates for an employee and/or unemployment-insurance rates for an employer) for use in completing the document. This additional information may also include account history information that may be reconciled with the document, for example, to determine errors prior to submitting the document. In this way, the individual may have a unified or common experience when paying employment tax regardless of the governmental agency involved.

This approach may be implemented as a stand-alone software application, or as a program module or subroutine in another application, such as the payroll-accounting software. Furthermore, the software may be configured to execute on a client computer, such as a personal computer, a laptop computer, cell phone, PDA, or other device capable of manipulating computer readable data, or between two or more computing systems over a network (such as the Internet, World Wide Web or WWW, Intranet, LAN, WAN, MAN, or combination of networks, or other technology enabling communication between computing systems). Therefore, partially completed electronic templates or documents, as well as the financial information may be stored locally (for example, on a local computer) and/or remotely (for example, on a computer or server that is accessed via a network).

We now describe embodiments of a computer system, a method, and software for paying employment tax. FIG. 1 provides a block diagram illustrating a computer system 100 that includes a number of computers and servers that are networked together in accordance with an embodiment of the present invention. One or more users may complete at least a portion of an employment-tax electronic template using an employment-tax program that executes on computer 110. As noted above, this employment-tax program may be a stand-alone application or may be embedded in another application. In one embodiment, the employment-tax program is embedded in payroll-accounting software, such as QuickBooks™ (from Intuit, Inc., of Mountain View, Calif.), PeachTree Complete™ (from the Sage Group PLC, of London, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Small Business Manager™ (from Microsoft Corporation, of Redmont, Wash.), Simply Accounting™ (from the Sage Group PLC, of London, the United Kingdom), CYMA IV Accounting™ (from CYMA Systems, Inc., of Temple, Ariz.), DacEasy™ (from Sage Software SB, Inc., of Lawrenceville, Ga.), Microsoft Money™ (from Microsoft Corporation, of Redmont, Wash.), and/or other financial-accounting software capable of processing payroll information. In another embodiment, the employment-tax program is embedded in financial-planning software, such as Quicken™ and/or TurboTax™ (from Intuit, Inc., of Mountain View, Calif.), Microsoft Money™ (from Microsoft Corporation, of Redmont, Wash.), SplashMoney™ (from SplashData, Inc., Los Gatos, Calif.), Mvelopes™ (from In2M, Inc., Draper, Utah), and/or open-source applications such as Gnucash™, PLCash™, Budget™ (from Snowmint Creative Solutions, LLC), and/or other financial-planning software capable of processing financial information.

The employment tax program may be resident on the computer 100. However, other embodiments may utilize an employment-tax tool that is embedded in a web page (once again, either as a stand-alone application or as a portion of another application). This web page may be provided by a server 114 via network 112. In an exemplary embodiment, the employment-tax tool is a software package written in JavaScript™ (i.e., the employment-tax tool includes programs or procedures containing JavaScript instructions), ECMAScript (the specification for which is published by the European Computer Manufacturers Association International), VBScript™ (a trademark of Microsoft, Inc.) or any other client or server-side scripting language. In other words, the embedded employment-tax tool may include programs or procedures containing JavaScript, ECMAScript instructions, VBScript instructions, or instructions in another programming language suitable for rendering by a browser or another client application on the computer 110.

The employment-tax program may provide the user with an electronic template that is compatible with a submission format of a governmental agency to which the employment tax will be submitted, such as a withholding agency, an unemployment agency, a filing agency, and/or a payment agency (for example, the Internal Revenue Service). The electronic template may be selected from a set of electronic templates that are associated with corresponding local, state, and/or federal governmental agencies. In some embodiments, the set of electronic templates are stored locally (on the computer 110) or remotely on the server 114 or in a data structure 116 that is accessed via the network 116. Furthermore, the employment-tax program may have a common user interface such that the user has a unified or similar experience when paying employment tax regardless of the governmental agency involved.

The employment-tax program may access and retrieve stored financial information for one or more employers and/ or employees. This financial information may be stored locally on the computer 110 or remotely, for example, on the server 114 or in a data structure 118. The financial information includes employment tax information for the one or more employers and/or employees, such as payroll tax information for the one or more employees and/or payroll tax information for the one or more employers. In an exemplary embodiment, the payroll tax information has a format that is compatible with the payroll-accounting software. Note that the financial information may therefore include data from current and/or previous employment tax payments, i.e., account history information for the one or more employers and/or the one or more employees.

The employment-tax program merges the financial information with the electronic template to generate a document (for example, a form and/or a payment voucher) that includes the employment-tax information that is required by the governmental agency. While using the employment-tax program, the user may provide supplemental information that is needed to complete the document. For example, the user may provide demographic information, an address, a phone number, a Social Security number, and/or a driver's license number.

In addition, the employment-tax program may access an information portal (such as a website or web page) of one or more governmental agencies (via the network 112) to obtain additional information (such as taxation rates for an employee and/or unemployment-insurance rates for an employer) for use in completing the document. These information portals may be hosted on corresponding servers for the governmental agencies 118.

In an exemplary embodiment, the accessing operation includes a login procedure. In addition the additional information is obtaining or aggregated by browsing the information portal, scraping the content on the information portal, and parsing the additional information from the subset of the content. For example, web page content that includes fields with the phrases "withholding tax" or "quarterly payment" may be identified using query matching techniques (such as a Boolean query expression and corresponding matching scores for the content). Candidate content in the web page that are suitable match the query expression (i.e., that have large enough matching scores) may be scraped by moving such content into an Extensible-Markup-Language (XML) format via interface tagging and documentation. This transforms the content into a format that is compatible with the employment-tax program. Note that in some embodiments changes in content on one or more of the governmental agency servers 118 may be routinely scraped and parsed, either periodically and/or based on changes in the content. And in some embodiments, one or more of the electronic templates may be revised or updated based on changes in the content that are determined (i.e., the one or more electronic templates may be revised prior to the user accessing such a template during a current session or usage of the employment-tax program).

This additional information may also include account history information for the one or more employers and/or the one or more employees. The employment-tax program may reconcile the additional information with the document, for example, to determine errors prior to submitting the document. If an error is determined or if information is needed to complete the document, the employment-tax program may notify the user. For example, a list of the missing information may be provided (it may be displayed or printed out). Alternatively, the user may be queried for at least some of the remaining information that is needed. However, in some embodiments the employment-tax program sends a request to one of more third parties (such as one of the governmental servers 118) for such information.

Partially completed documents may be stored locally on the computer 110 or remotely on the server 114 or in the data structure 116. Such a partially completed document may be subsequently retrieved and completed. Thus, in some embodiments, when the employment-tax program is started a stored partially completed document is accessed and retrieved.

Once the document is completed, it is submitted to the governmental agency. In an exemplary embodiment, the submission is made via the network to a corresponding server for the governmental agency, such as the governmental agency server 118-1. For example, the document may be submitted using email or using another communication protocol from the computer 110 or server 114 to the governmental agency server 118-1. However, in other embodiments the document may be printed out and submitted to the governmental agency by conventional techniques, such as mail and/or facsimile.

The submission of the document may be fully automated or partially automated. Thus, the submission of the document may be performed in real-time (i.e., while the user is using the employment-tax program) or off-line (i.e., the submission may occur after the user has discontinued a session with the employment-tax program). For example, in some embodiments the employment-tax program may assemble several completed documents for submission to one or more governmental agencies and may process the submissions as a group. Alternatively, completed documents may be submitted to corresponding governmental agencies at a later time based on a calendar or time schedule for such submissions.

In an exemplary embodiment, the data fields in the document are bridged to or combined with an interface of the information portal during the submission process using fuzzy matching of terminology. This bridging may be based on rules for possible values and tracking parameters for the interface (for example, probabilities or fuzzy percentages for a match). Such rules may be updated when the content on one or more of the governmental agency servers 118 is routinely scraped and parsed. In this way, the information in the document may be 'mashed' into the interface for the governmental agency during the submission process.

In some embodiments the employment-tax program may present status information to the user during the submission process to allow the user to monitor the transaction. When a given document is successfully submitted, an acknowledgement (including a time stamp, such as a date and/or a time of the submission) may be received from the governmental agency. The employment-tax program may parse the received acknowledgement (if necessary) to extract acknowledgement information (such as a confirmation) and present this information to the user.

The material included in the document is of a sensitive nature. As a consequence, in some embodiments the user may provide one or more security tokens, such as a PIN code, a user name, and/or a password) in order to use the employment-tax program or to access associated stored files or stored financial information. In addition, in some embodiments the stored files, the stored financial information, and/or data communicated over the network 112 are encrypted. For example, communication may utilize a protocol such as HyperText Transfer Protocol Secure (HTTPS). Note that in some embodiments the computer system 100 includes fewer or additional components, two or more components are combined into a single component, and/or a position of one or more components may be changed.

Figure 2:
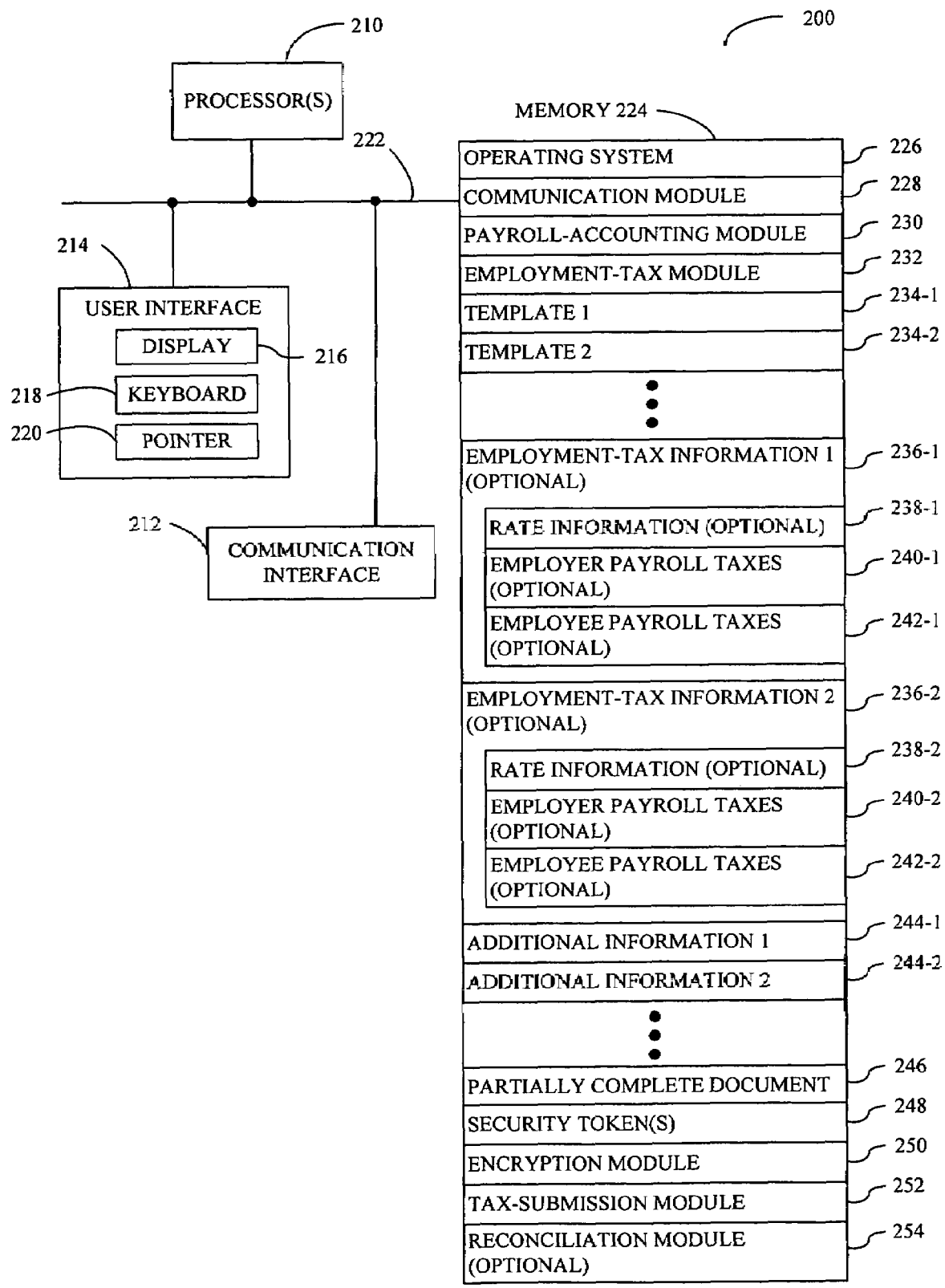
FIG. 2 is a block diagram illustrating a computer system in accordance with an embodiment of the present invention.

FIG. 2 provides a block diagram illustrating a computer system 200 in accordance with an embodiment of the present invention. The computer system 200 includes one or more processors 210, a communication interface 212, a user interface 214, and one or more signal lines 222 coupling these components together. Note that the one or more processing units 210 may support parallel processing and/or multi-threaded operation, the communication interface 212 may have a persistent communication connection, and the one or more signal lines 222 may constitute a communication bus. Moreover, the user interface 214 may include a display 216, a keyboard 218, and/or a pointer 220, such as a mouse.

Memory 224 in the computer system 200 may include volatile memory and/or non-volatile memory. More specifically, memory 224 may include ROM, RAM, EPROM, EEPROM, FLASH, one or more smart cards, one or more magnetic disc storage devices, and/or one or more optical storage devices. Memory 224 may store an operating system 226 that includes procedures (or a set of instructions) for handling various basic system services for performing hardware dependent tasks. While not explicitly indicated in the computer system 200, in some embodiments the operating system 226 includes a web browser. The memory 224 may also store procedures (or a set of instructions) in a communication module 228. The communication procedures may be used for communicating with one or more computers and/or servers, including computers and/or servers that are remotely located with respect to the computer system 200.

Memory 224 may also include multiple program modules (or a set of instructions), including payroll-accounting module 230 (or a set of instructions) and employment-tax module 232 (or a set of instructions). As noted previously, in some embodiments, the employment-tax module 232 is embedded in the payroll-accounting module 230 and is configurable or configured to execute in the environment of the payroll-accounting module 230.

Furthermore, memory 224 may include one or more electronic templates 234 that are compatible with formats of corresponding governmental agencies. In addition, memory 224 may optionally include employment-tax information 236 and/or additional information 244 for one or more individuals, organizations, and/or corporations. (As noted previously, in some embodiments at least some of the employment-tax information 236 and/or the additional information 244 is stored remotely from the computer system 200.) The optional employment-tax information 236 may optionally include rate information 238 (such as a tax rate for an employee or an unemployment-insurance rate for an employer), employer payroll taxes 240, and/or employee payroll taxes 242. Furthermore, in some embodiments memory 224 includes at least one partially complete electronic document 246.

Memory 224 may include one or more security tokens 248 to restrict access to stored data such as the financial information 236. Security may also be enhanced using an encryption module 250 (or a set of instructions) that encrypt data and/or stored information. Furthermore, memory 224 may include a tax-submission module 252 (or a set of instructions) to submit one or more completed documents, and an optional reconciliation module 254 (or a set of instructions) to determine errors and/or the accuracy of information in a given document based on account history information received from one or more governmental agencies (for example, via one of the governmental agency servers 118 in FIG. 1).

Instructions in the various modules in the memory 224 may be implemented in a high-level procedural language, an object-oriented programming language, and/or in an assembly or machine language. The programming language may be compiled or interpreted, i.e, configurable or configured to be executed by the one or more processing units 210.

Although the computer system 200 is illustrated as having a number of discrete items, FIG. 2 is intended to be a functional description of the various features that may be present in the computer system 200 rather than as a structural schematic of the embodiments described herein. In practice, and as recognized by those of ordinary skill in the art, the functions of the computer system 200 may be distributed over a large number of servers or computers, with various groups of the servers or computers performing particular subsets of the functions. In some embodiments, some or all of the functionality of the computer system 200 may be implemented in one or more ASICs and/or one or more digital signal processors DSPs.

The computer system 200 may include fewer components or additional components, two or more components may be combined into a single component, and/or a position of one or more components may be changed. In some embodiments the functionality of the computer system 200 may be implemented more in hardware and less in software, or less in hardware and more in software, as is known in the art.

Figure 3:
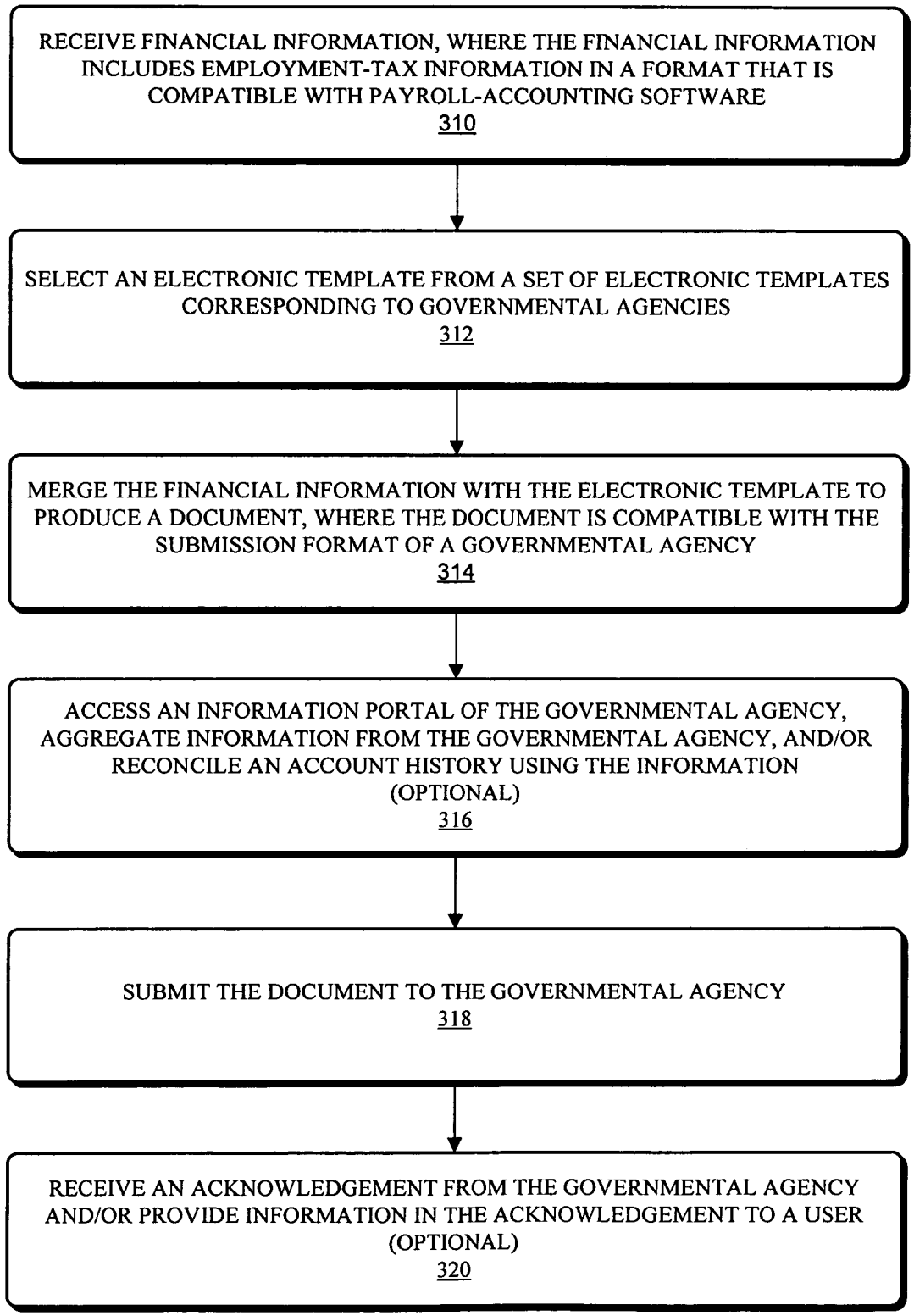
FIG. 3 is a flow chart illustrating a process for paying employment tax in accordance with an embodiment of the present invention.

We now discuss methods for paying employment tax. FIG. 3 provides a flow chart illustrating a process 300 for paying employment tax in accordance with an embodiment of the present invention. During this process 300, the system receives financial information (310). Note that this financial information includes employment-tax information in a format that is compatible with payroll-accounting software. The system selects an electronic template from a set of electronic templates corresponding to governmental agencies (312). Furthermore, the system merges the financial information with the electronic template to produce a document (314). Note that the document is compatible with the submission format of a governmental agency.

The system may optionally access an information portal of the governmental agency (for example, by logging on to a website), aggregate information from the governmental agency, and/or reconcile an account history using the information (316).

Then, the system submits the document to the governmental agency (318). For example, one page on the website may be pre-filled and submitted. In some embodiments, the system receives an acknowledgement from the governmental agency and/or provides information in the acknowledgement to a user (320). Note that in some embodiments there may be additional or fewer operations, the order of the operations may be changed, and two or more operations may be combined into a single operation. For example, while not shown in FIG. 3, the system may update the set of electronic templates such that the electronic templates are compatible with current formats of associated governmental agencies.

Figure 4:
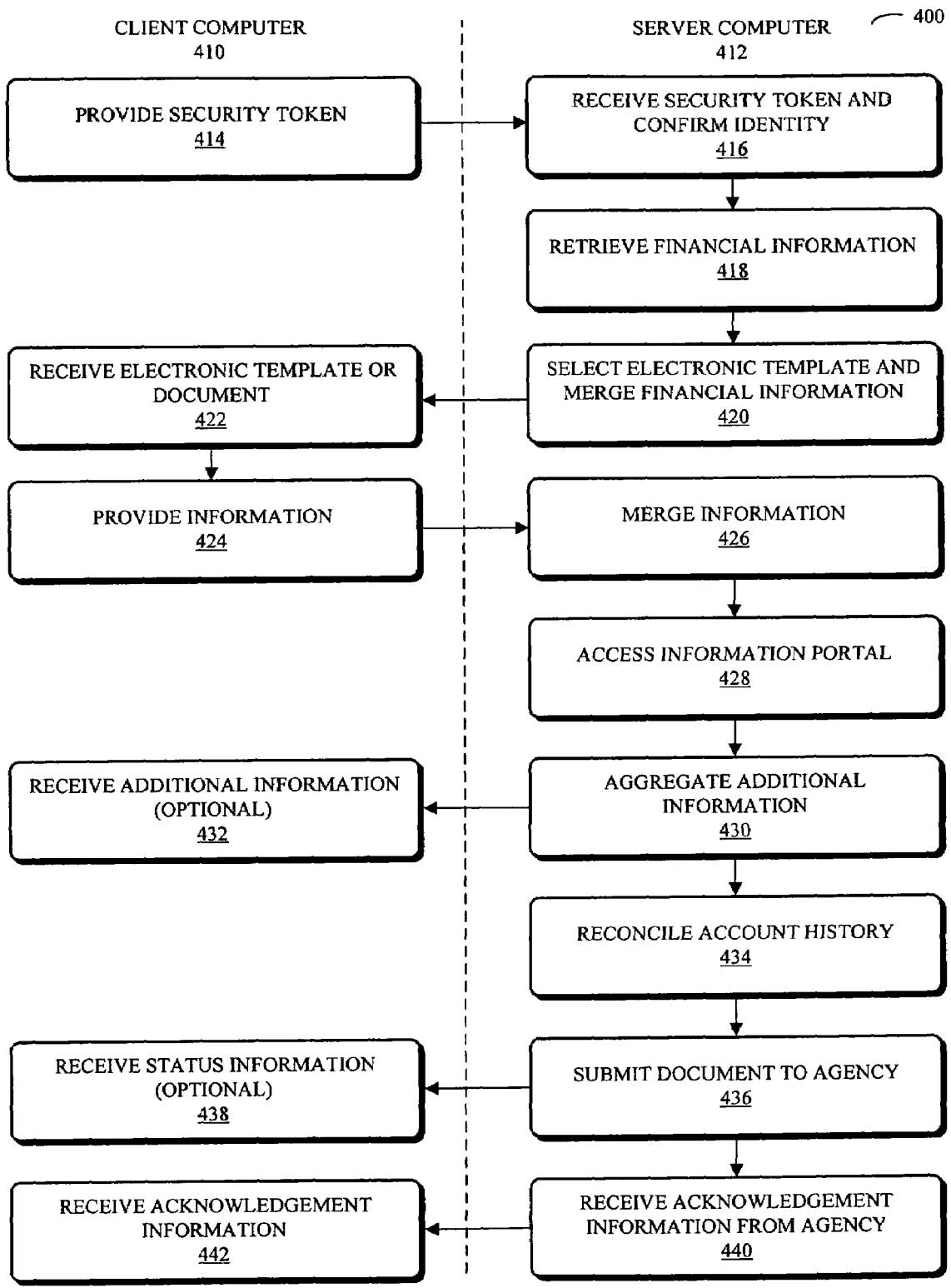
FIG. 4 is a flow chart illustrating a process for paying employment tax in accordance with an embodiment of the present invention.

FIG. 4 is a flow chart illustrating a process 400, such as that utilized in an on-line environment, for paying employment tax in accordance with an embodiment of the present invention. During the process 400, a user of the employment-tax program or tool at a client computer 410 provides a security token (414) that is transmitted via a network, such as the network 112 (FIG. 1), to a sever computer 412. The system receives this security token and confirms an identity of the user (416).

Then, the system retrieves financial information for the user (418). The system selects an electronic template that is compatible with the governmental agency and merges the financial information with the electronic template (420). The electronic template or document is provided to and received by the user (422), who provides supplemental information (424). In some embodiments, the system queries the user to provide this supplemental information. The system then merges the supplemental information with the electronic template (426).

Furthermore, the system accesses an information portal of the governmental agency (428) and aggregates additional information (430) (i.e., collects or assembles the additional information). This additional information may be optionally provided to and received by the user (432). Then, the system reconciles the additional information with the information in the document (434).

A completed document is submitted to the governmental agency (436) and optional status information may be provided to and received by the user (438). Furthermore, acknowledgement information is received by the server computer 412 from the governmental agency (440). This acknowledgement information is provided to and received by the user (442). Note that in some embodiments there may be additional or fewer operations, the order of the operations may be changed, and two or more operations may be combined into a single operation.

Figure 5A:
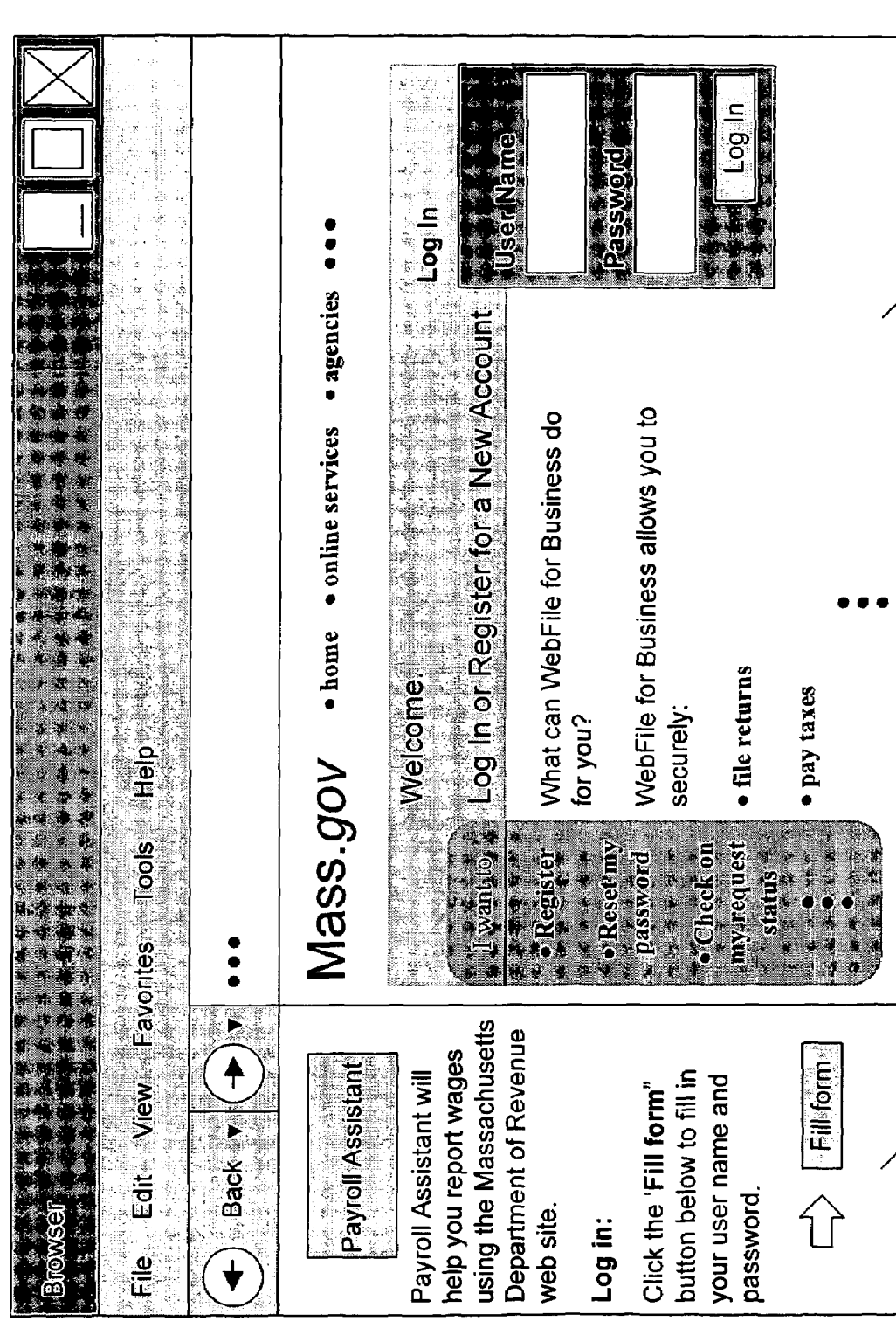
FIG. 5A is a block diagram illustrating a screen shot of a user interface in an embodiment of the present invention.

We now discuss user interfaces that may be used in the computer system 100 (FIG. 1) and/or 200 (FIG. 2). FIGS. 5A-5E provide block diagrams illustrating screen shots of user interfaces in an embodiment of the present invention. These user interfaces may provide the individual, who is using the employment tax module or application, a unified or common experience when paying employment tax regardless of the governmental agency involved. In FIG. 5A, a user interface 500 includes a window 512 in a browser that shows the front-page for the Massachusetts government web page or website. In addition, another window 510 provides a link to a payroll assistant (i.e., the employment tax module or application), including log-in instructions.

Figure 5B:
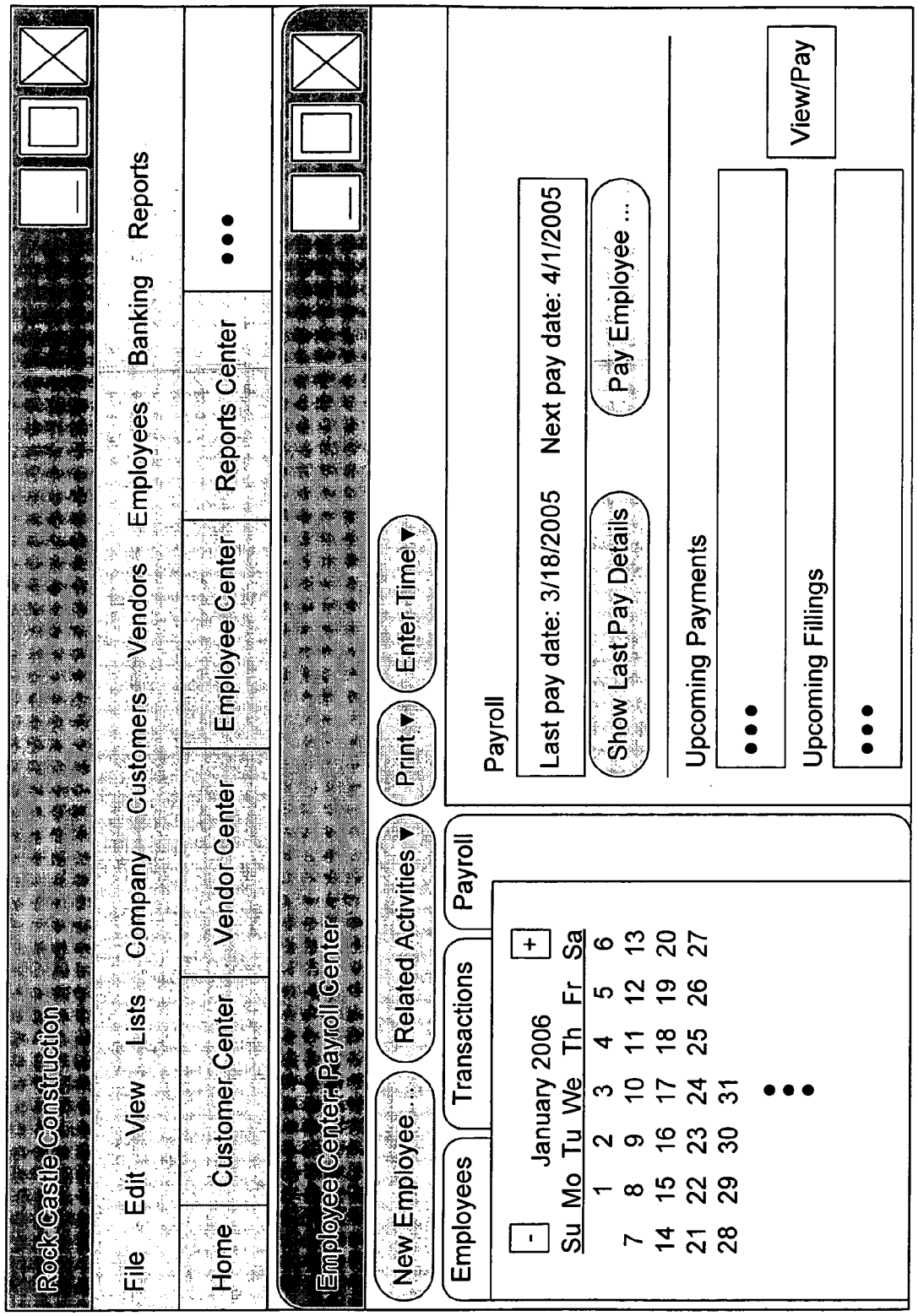
FIG. 5B is a block diagram illustrating a screen shot of a user interface in an embodiment of the present invention.
Figure 5C:
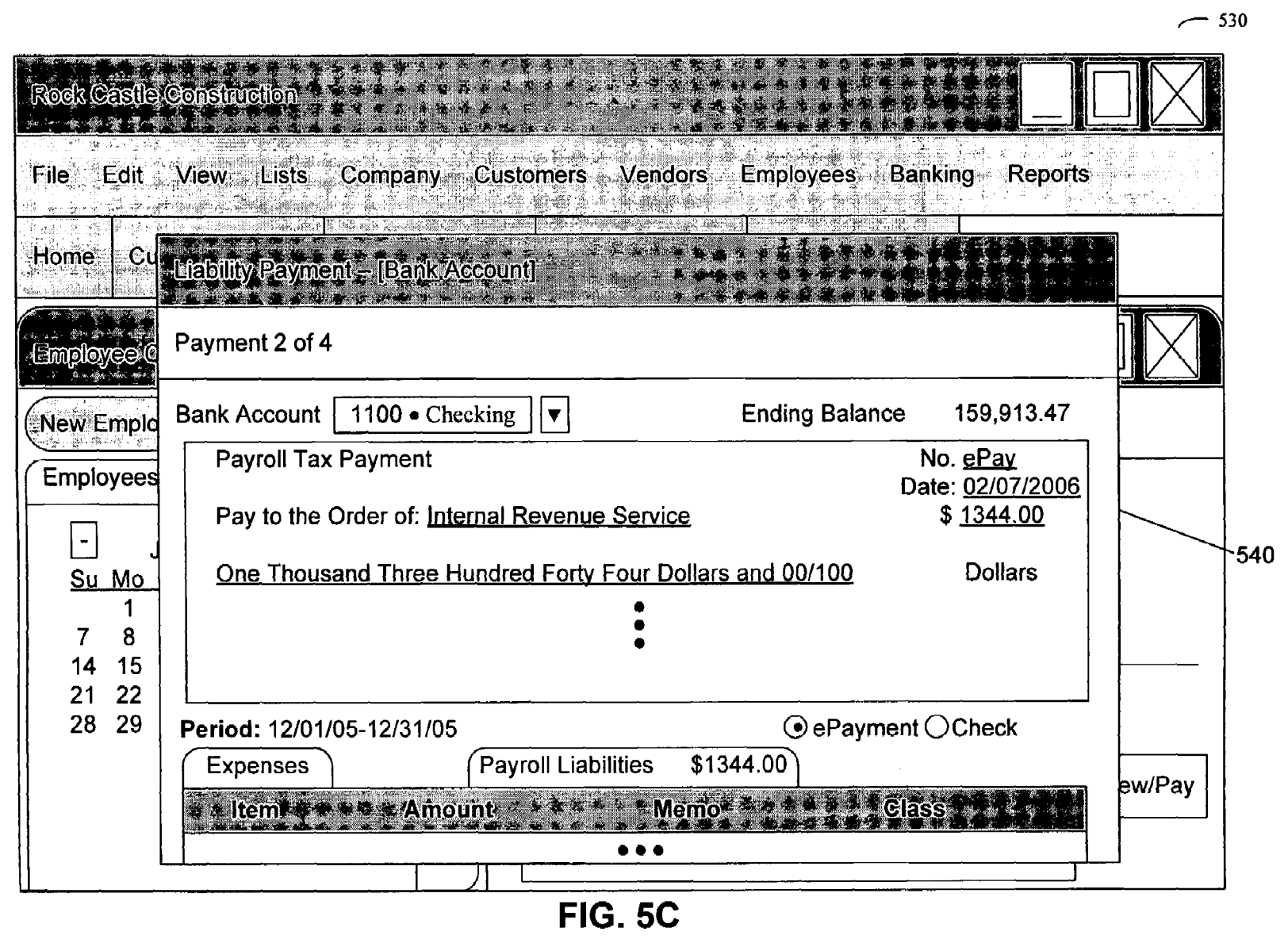
Figure 5D:
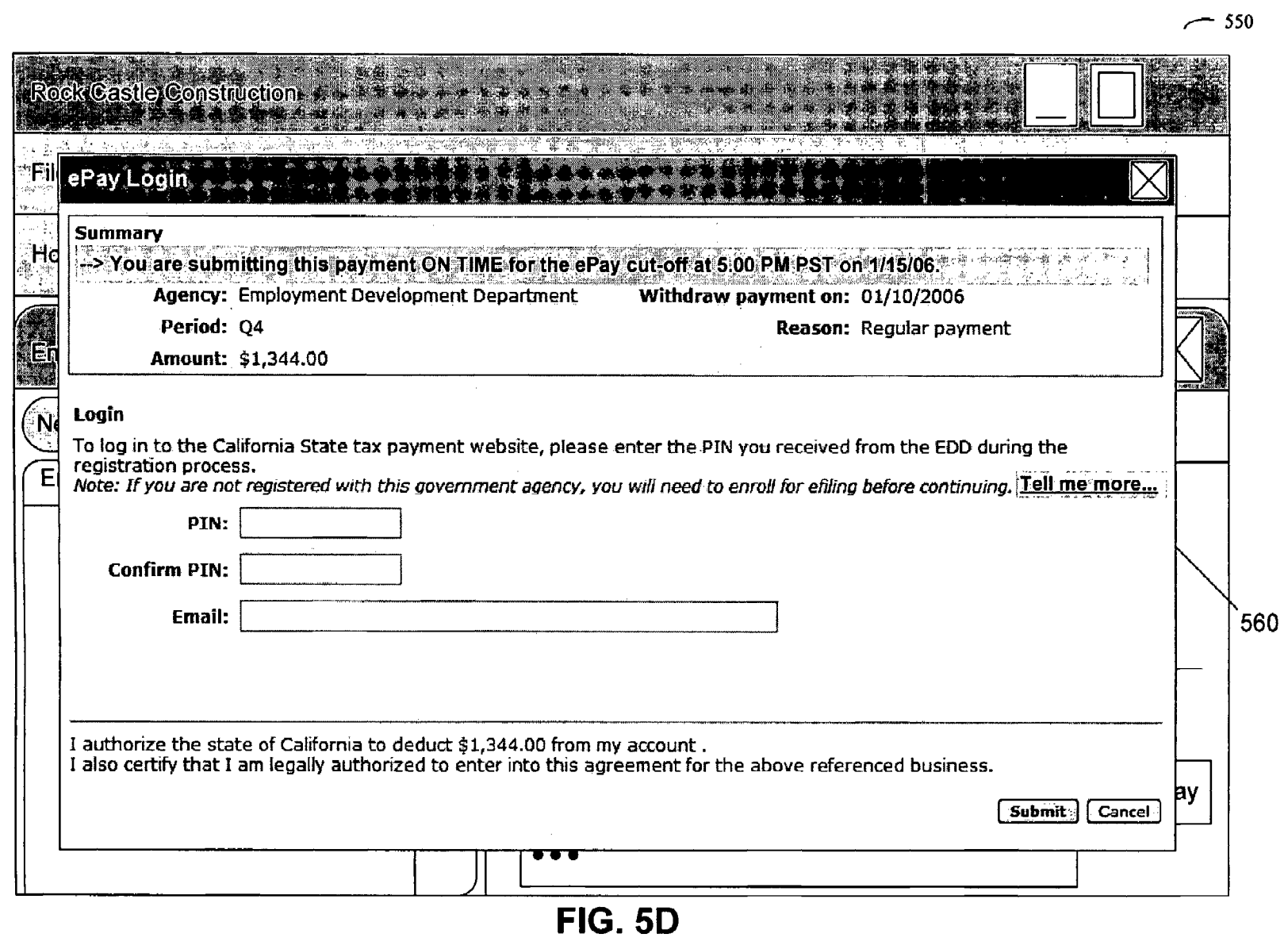
Figure 5E:
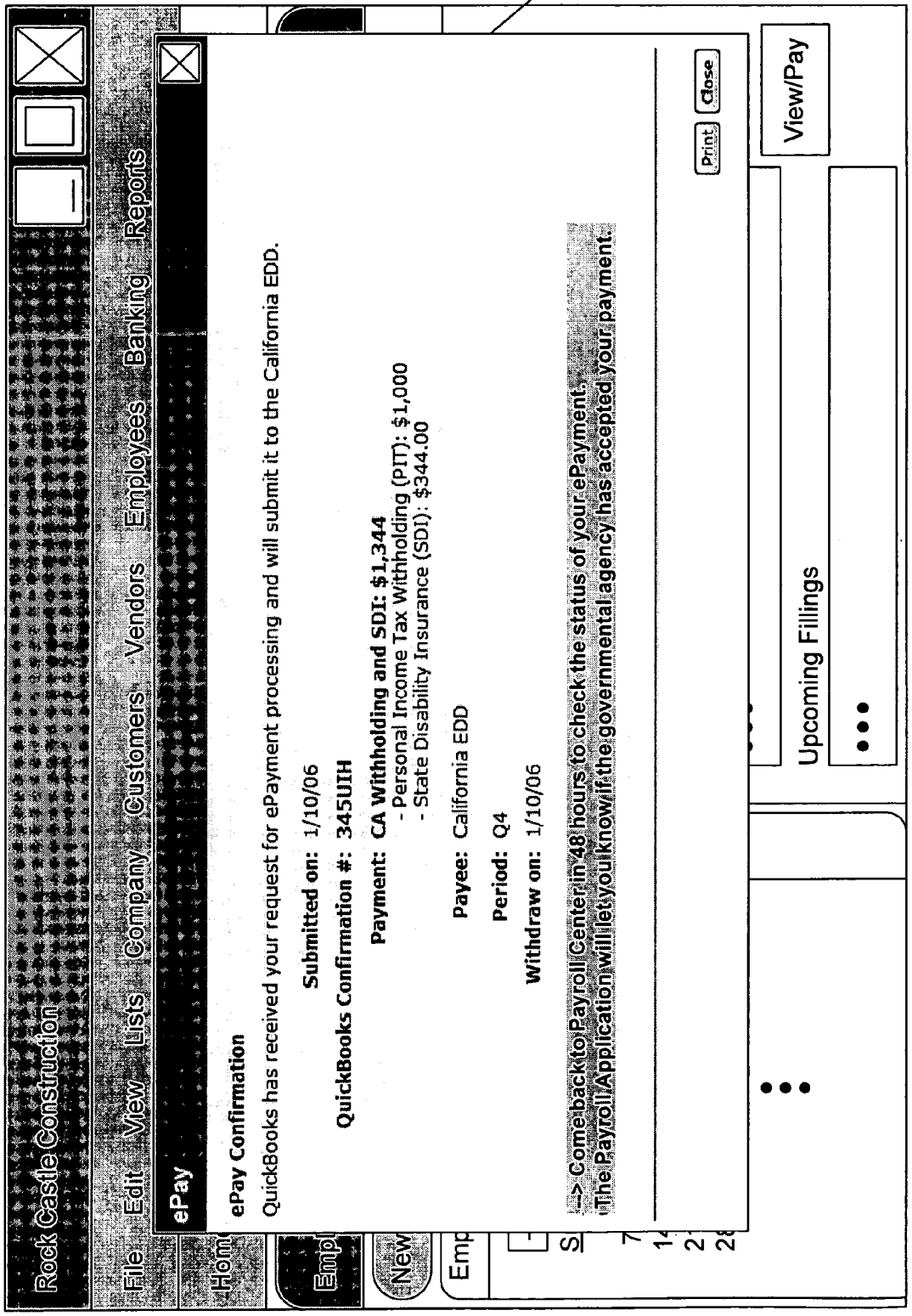
FIG. 5E is a block diagram illustrating a screen shot of a user interface in an embodiment of the present invention.

After logging in to the payroll assistant, the user may interact with user interface 520 in FIG. 5B. This interface may include a range of options for payment and/or monitoring of employee salaries (i.e., payroll) and employment taxes. For example, upcoming payroll payments in the payroll tab or window may include information such as the due date, status, who payment is being made to, the payment amount, and/or the time period, and the upcoming filings may include information such as the due date, the status, the filing form, and/or the time period. In addition, the user may be able to view the payment history.

As illustrated in user interface 530, if the user selects a view/pay icon for an upcoming filing, the corresponding payment (for example, in the form of an electronic or e-payment) and summary information may be displayed in a separate window or tab, such as window 540. When the user is ready to make payment, selection of the appropriate icon may result in a window 560 being displayed in user interface 550. This window may include identifiers for the employer (such as a user name and password) that the employer uses to access a governmental portal (such as the website for the State of California). Note that the user may have previously registered on the State of California website to obtain this user name and password. In some embodiments, the user name and password are stored in the employment tax module or application.

After the user submits a payment, a confirmation message may be displayed in a window 580 in user interface 570. In addition, the user may be prompted to use the employment tax application several days later to monitor the status of this payment. Note that the employment tax application provides a common user interface (i.e., a common user experience) for the user, even when accessing different portals for different governmental agencies. In a similar fashion, the employment tax application may routinely update the set of electronic forms for use in filling tax and employment payments with these various governmental agencies. These updates may be generated in a transparent fashion (i.e., without direct action by the user) when one or more of these agencies posts an update. In this way, the user may continue to make employment and tax payments in an uninterrupted fashion.

Note that in some embodiments, user interfaces 500, 520, 530, 550, and 570 may include fewer items or additional items, a position of at least one item may be changed, and/or two or more items may be combined. For example, at least one of these user interfaces may include additional graphical icons.

We now discuss data structures that may be used in the computer system 100 (FIG. 1) and/or 200 (FIG. 2). FIG. 6 provides a block diagram illustrating a data structure 600 in accordance with an embodiment of the present invention. This data structure may include financial information 610 for one or more employers and/or employees. The financial information 610 may include rate information 612, employee tax information 614, and/or employer tax information 616.

FIG. 7 provides a block diagram illustrating a data structure 700 in accordance with an embodiment of the present invention. This data structure may include electronic templates 710. The electronic templates 710 may include information about a governmental agency 712 and/or a corresponding format 714. As noted previously, the employment-tax program may revise one or more of the electronic templates 710 based on detected changes to content of an information portal of one or more corresponding governmental agencies. Revisions may be periodically (after a pre-determined time interval) and/or dynamically when changes to the content are detected. Note that that in some embodiments of the data structures 600 and/or 700 there may be fewer or additional components, two or more components may be combined into a single component, and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for paying employment tax, comprising:
   updating a set of electronic templates such that the electronic templates at a computer memory are compatible with current formats of associated governmental agencies;
   receiving financial information at a computer processor, wherein the financial information includes employment-tax information, and wherein the employment-tax information has a format that is compatible with payroll-accounting software;
   merging the financial information with an electronic template to produce a document, wherein the electronic template is compatible with a submission format of a governmental agency, and wherein the electronic template is selected from the set of electronic templates;
   accessing an information portal of the governmental agency via a network to obtain additional information for use in completing the document; and
   submitting the document to the governmental agency by:
      scraping and parsing content at the information portal into a tag-based form at;
      using probabilistic rules to match the document the document and the parsed content; and
      combining the data fields of the document with an interface of the information portal based on the matched format.

2. The method of claim 1, further comprising receiving an acknowledgement from the governmental agency.

3. The method of claim 2, further comprising providing information in the acknowledgement to a user.

4. The method of claim 3, further comprising parsing the acknowledgement to extract the information provided to the user.

5. The method of claim 1, wherein the payroll-accounting software includes QuickBooks™.

6. The method of claim 1, wherein the governmental agency includes a withholding agency, an unemployment agency, a filing agency, or a payment agency.

7. The method of claim 1, wherein the employment-tax information includes payroll-tax information for an employee.

8. The method of claim 1, wherein the employment-tax information includes payroll-tax information for an employer.

9. The method of claim 1, further comprising presenting additional information to a user while submitting the document to allow the user to monitor the submission.

10. The method of claim 1, wherein the information portal includes a website or a web page.

11. The method of claim 1, wherein the accessing operation involves performing a login procedure.

12. The method of claim 1, further comprising:
    aggregating additional information from the governmental agency; and
    providing the additional information to a user.

13. The method of claim 12, further comprising reconciling an account history using the additional information.

14. The method of claim 12, wherein the additional information includes taxation rates for an employee or unemployment-insurance rates for an employer.

15. The method of claim 1, wherein the financial information is stored at a remote location and is accessed via a network.

16. A computer program product for use in conjunction with a computer system, the computer program product comprising a computer-readable storage medium and a computer-program mechanism stored on the computer-readable storage medium for configuring the computer system, the computer-program mechanism including:
    instructions for updating a set of electronic templates such that the electronic templates are compatible with current formats of associated governmental agencies;
    instructions for receiving financial information, wherein the financial information includes employment-tax information, and wherein the employment tax information has a format that is compatible with payroll-accounting software;
    instructions for merging the financial information with an electronic template to produce a document, wherein the electronic template is compatible with a submission format of a governmental agency, and wherein the electronic template is selected from the set of electronic templates;
    instructions for accessing an information portal of the governmental agency via a network to obtain additional information for use in completing the document; and
    instructions for submitting the document to the governmental agency, wherein the instructions submit the document by:
       scraping and parsing content at the information portal into a tag-based format;
       using probabilistic rules to match the document and the parsed content; the information portal; and
       combining the data fields of the document with an interface of the information portal based on the matched format.

17. A computer system, comprising:
    a processor;
    memory;
    a program module, wherein the program module is stored in the memory and configurable to be executed by the processor, the program module including:
    instructions for updating a set of electronic templates such that the electronic templates are compatible with current formats of associated governmental agencies;
    instructions for receiving financial information, wherein the financial information includes employment-tax information, and wherein the employment-tax information has a format that is compatible with payroll-accounting software;
    instructions for merging the financial information with an electronic template to produce a document, wherein the electronic template is compatible with a submission format of a governmental agency, and wherein the electronic template is selected from the set of electronic templates;
    instructions for accessing an information portal of the governmental agency via a network to obtain additional information for use in completing the document; and
    instructions for submitting the document to the governmental agency, wherein the instructions submit the document by:
       scraping and parsing content at the information portal into a tag-based format;
       using probabilistic rules to match the document and the parsed content; and
       combining the data fields of the document with an interface of the information portal based on the matched format.

* * * * *

UNITED STATES PATENT AND TRADEMARK OFFICE
CERTIFICATE OF CORRECTION

PATENT NO.        : 7,685,032 B2
APPLICATION NO.   : 11/528180
DATED             : March 23, 2010
INVENTOR(S)       : Jeff A. Zias et al.

It is certified that error appears in the above-identified patent and that said Letters Patent is hereby corrected as shown below:

In claim 1 (at column 11, line 24), please replace the words "form at" with the word --format-- so that the line reads: "into a tag-based format;".

In claim 1 (at column 11, line 25), please delete the duplicated words "the document" so that the line reads: "using probabilistic rules to match the".

Signed and Sealed this

Eleventh Day of May, 2010

David J. Kappos
*Director of the United States Patent and Trademark Office*